US011213181B2

(12) United States Patent
Ohm et al.

(10) Patent No.: US 11,213,181 B2
(45) Date of Patent: Jan. 4, 2022

(54) FLOATING BUMPER IN AUTONOMOUS CLEANING ROBOT

(71) Applicant: iRobot Corporation, Bedford, MA (US)

(72) Inventors: Timothy R. Ohm, Grover Beach, CA (US); Erik Amaral, Bolton, MA (US); Andrew Deschenes, Arlington, MA (US)

(73) Assignee: iRobot Corporation, Bedford, MA (US)

( * ) Notice: Subject to any disclaimer, the term of this patent is extended or adjusted under 35 U.S.C. 154(b) by 190 days.

(21) Appl. No.: 16/689,775

(22) Filed: Nov. 20, 2019

(65) Prior Publication Data

US 2021/0145236 A1    May 20, 2021

(51) Int. Cl.
*A47L 11/40* (2006.01)
*G05D 1/00* (2006.01)
*G05D 1/02* (2020.01)

(52) U.S. Cl.
CPC ........ *A47L 11/4061* (2013.01); *G05D 1/0088* (2013.01); *G05D 1/0227* (2013.01); *G05D 1/0259* (2013.01); *A47L 2201/04* (2013.01); *G05D 2201/0203* (2013.01)

(58) Field of Classification Search
CPC ............ A47L 11/4061; A47L 2201/04; A47L 9/2805; G05D 1/0088; G05D 1/0227; G05D 1/0259; G05D 2201/0203
See application file for complete search history.

(56) References Cited

U.S. PATENT DOCUMENTS

| 6,883,201 | B2 | 4/2005 | Jones et al. |
| 8,584,305 | B2 | 11/2013 | Won et al. |
| 8,950,792 | B2 | 2/2015 | Hickey et al. |
| 9,505,140 | B1 | 11/2016 | Fay et al. |
| 2005/0021181 | A1* | 1/2005 | Kim ..................... G05D 1/0227 700/245 |
| 2017/0203440 | A1* | 7/2017 | Koselka ................. B25J 13/084 |
| 2018/0265137 | A1* | 9/2018 | Ebrahimi Afrouzi .. B62D 24/04 |

FOREIGN PATENT DOCUMENTS

| DE | 202009010809.0 | 12/2009 |
| EP | 1724652 | 11/2006 |
| EP | 2803255 | 11/2014 |
| JP | S60191855 | 9/1985 |
| WO | 2009095830 | 8/2009 |
| WO | WO-2021101597 A1 | 5/2021 |

OTHER PUBLICATIONS

"International Application Serial No. PCT US2020 043687, International Search Report dated Nov. 3, 2020", 5 pgs.
"International Application Serial No. PCT US2020 043687, Written Opinion dated Nov. 3, 2020", 8 pgs.

* cited by examiner

*Primary Examiner* — Michael J Zanelli
(74) *Attorney, Agent, or Firm* — Schwegman Lundberg & Woessner, P.A.

(57) ABSTRACT

An autonomous mobile cleaning robot can include a robot body, a bumper, and a coupling. The robot body can include a displacement sensor. The bumper can be moveably coupled to the body. The coupling can include a displacement limiter associated with the displacement sensor. The displacement limiter can inhibit or limit sensing by the displacement sensor of displacement of the bumper from the robot body caused by forces below a threshold horizontal force value.

20 Claims, 6 Drawing Sheets

FLOATING BUMPER IN AUTONOMOUS CLEANING ROBOT

BACKGROUND

Autonomous mobile robots include autonomous cleaning robots that can autonomously perform cleaning tasks within an environment, such as a home. Many kinds of cleaning robots are autonomous to some degree and in different ways. The autonomy of mobile cleaning robots can be enabled by the use of a sensors receiving inputs from, or caused by the robot's interaction with, the environment, where the sensors transmit signals to a controller. The controller can control operation of the robot based on analysis performed on one or more sensor signals.

SUMMARY

Some autonomous cleaning robots can include a bumper, such as a front bumper. When actuated, the front bumper can provide an indication that an obstacle has been encountered, and the robot can move away accordingly. However, in such a robot, the robot cannot sense obstacles encountered while backing up, which can lead to a reduction in mission completion. For example, such a robot can become wedged under a piece of furniture while backing up.

The inventors have recognized, among other things, that it may be possible to provide a bumper that forms a perimeter around the robot, where the bumper can provide obstacle detection in a rear direction and along the sides as well as the front direction. This type of bumper can help to reduce wedging events and can help to increase mission completion. The full perimeter bumper can also enable better chair/table behaviors because the robot will be able to avoid banging into furniture when backing up and can be configured to sense vertical bumps to help further reduce wedging and mission failure.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A controller of an autonomous cleaning robot can control operation of the robot based on analysis performed on one or more sensor signals delivered to the controller by sensors of the robot. In some examples, autonomous cleaning robots can use bump sensors. Bump sensors can be attached to a body of the robot and can be configured to detect when an outer bumper of the robot engages or bumps into an object. In such an instance, the object can engage the bumper to move the bumper with respect to the body of the robot, allowing the bumper to engage a switch. The switch can send a signal to the controller to indicate a bump, allowing the robot to change speed and/or direction to avoid future bumps of the same object.

It may be desired to detect bumps along a vertical axis. Vertical bump sensing can be important to help prevent wedging of autonomous cleaning robots (such as under furniture) during a mission. A Hall Effect (piezo-electric) sensor can be used to detect movement of the bumper in three dimensions (along 3 axes). Such a sensor can be useful when a floating or full bumper is used. That is, where a bumper can be secured to the outer shell that surrounds a periphery and where the bumper is movable independent of the robot body and outer shell.

In such a case, the bumper may move during normal cleaning operations due to, for example, acceleration of the robot within the environment. Because Hall Effect sensors can be relatively sensitive, such movements of the bumper can be interpreted as a bump by the controller of the robot. Sensor tolerances can be adjusted; however, a floating bumper that can move due to inertial forces may cause a lot of noise in the signal produced by the Hall Effect sensors, making it difficult for the controller to determine when a bump occurs.

This disclosure can help address such an issue, such as by providing one or more features that secure the bumper to the outer shell (such as a spring module). The spring module can act as a breakaway device configured to resist movement of the bumper relative to the body of the robot. The spring module can be configured such that one feature of the spring module can break away from another when a horizontal force applied to the bumper is greater than a threshold horizontal force, allowing for detection of horizontal bumps only when the bumps create a force larger than the threshold force. In some examples, the threshold force can be a maximum inertial force that can be applied to the bumper due to acceleration of the robot.

The above discussion is intended to provide an overview of subject matter of the present patent application. It is not intended to provide an exclusive or exhaustive explanation of the invention. The description below is included to provide further information about the present patent application.

Figure 1:
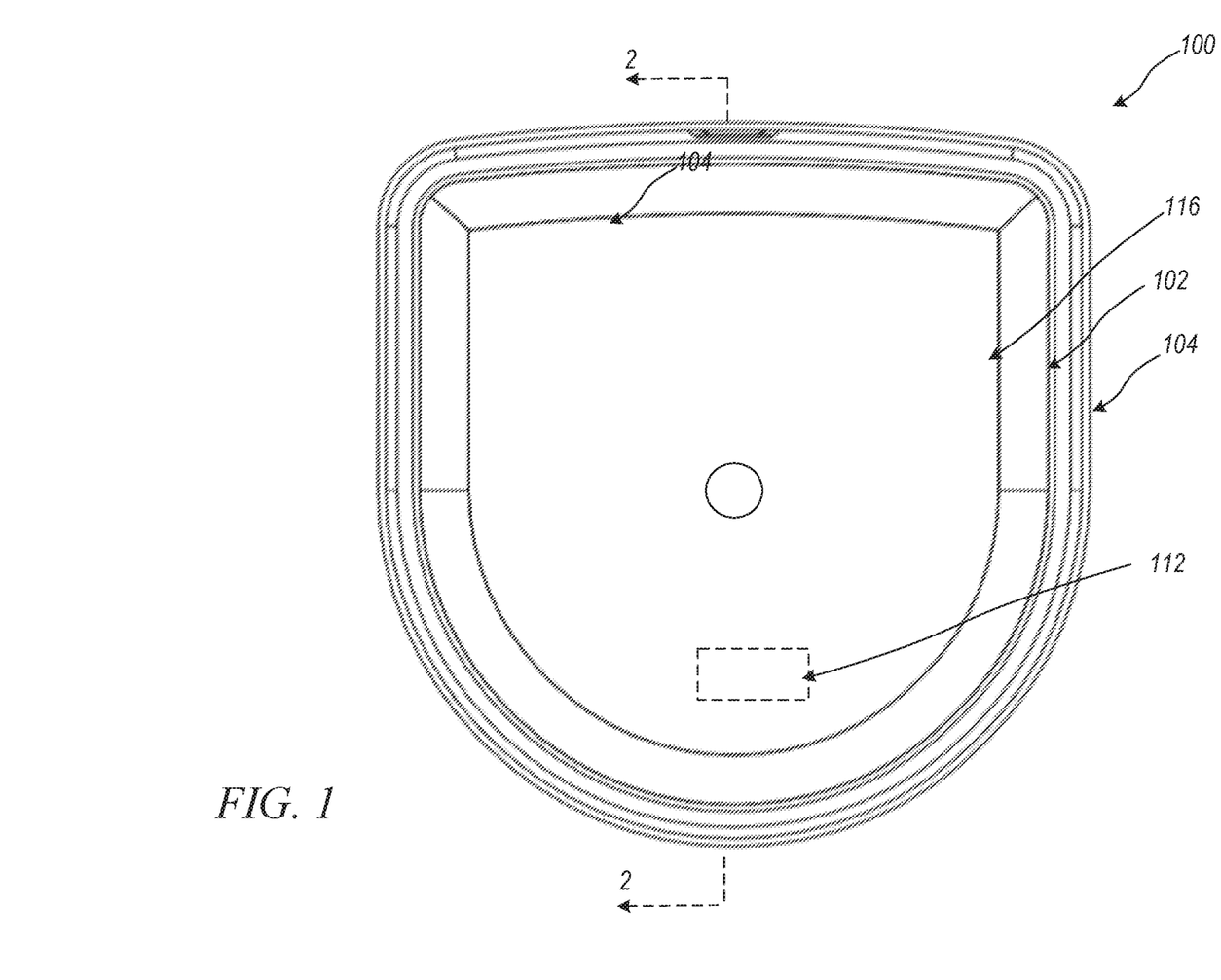
FIG. 1 illustrates a top view of an autonomous cleaning robot, in accordance with at least one example of this disclosure.

FIG. 1 illustrates a top view of an autonomous mobile cleaning robot 100, in accordance with at least one example of this disclosure. The autonomous mobile cleaning robot 100 can include an outer shell 102, a three-dimensional (3D) bumper or a bumper 104, a controller 112, and a body 116 of the robot 100.

The outer shell 102 can be a rigid or semi-rigid member secured to the body 116 of the robot and configured to support the bumper 104 thereon. The bumper 104 can be removably secured to the outer shell 102 and can be movable relative to the outer shell 102 while mounted thereto. The outer shell 102 and the bumper 104 can each be comprised of materials such as one or more of metals, plastics, foams, elastomers, ceramics, composites, combinations thereof, or the like.

In some examples, the bumper 104 can be formed of a single piece and configured to surround the body 116. In some examples, the bumper 104 can be multiple pieces connected together. The bumper 104 can be connected to the outer shell 102 of the robot 100 through features discussed below such that the bumper is suspended from the shell 102 (and the body 116). The outer shell 102 can be connected to the body 116 and can be configured to support the bumper 104, at least in part.

The controller 112 can be connected to the body 116 (or chassis) and can powered by a power supply of the robot 100. The controller 112 can be a programmable controller, such as a single or multi-board computer, a direct digital controller (DDC), a programmable logic controller (PLC), or the like. In other examples the controller 112 can be any computing device, such as a handheld computer, for example, a smart phone, a tablet, a laptop, a desktop computer, or any other computing device including a processor, memory, and communication capabilities.

The body 116 can be a rigid or semi-rigid structure comprised of materials such as one or more of metals, plastics, foams, elastomers, ceramics, composites, combinations thereof, or the like. The body 116 can be configured to support various components of the robot 100, such as the wheels 106, the controller 112, a battery, the extractor assembly 108, and the side brush. In some examples, a bottom retainer can be secured to the body 116 of the robot 100 and can help secure a bottom cover to the body 116. The bottom cover can be configured to cover and generally protect various components within the robot 100 from impact and debris.

In operation of some examples, the robot 100 can be controlled by a controller, autonomously, to perform a cleaning mission within an environment. The controller can control operation of drive wheels (shown in FIGS. 2A-2C) to move the robot 100 throughout the environment. The controller can also control operation of an extractor assembly (and a pump within the robot 100) to intake debris from the environment during the mission while a side brush can be operated by the controller to direct debris toward the extractor assembly.

During operation, the bumper 104 can be contacted by objects within the environment, which can cause movement of the bumper 104 with respect to the outer shell 102 as well as various other components of the robot 100. When the bumper 104 is bumped by one or more objects, it can move with respect to the body 116 and the outer shell 102. The movement can be detected by movement sensors in communication with the controller, which can analyze the signal to detect a bump and can further analyze the signal to determine a position of the object or objects based on the movement of the bumper 104 with respect to the outer shell 102 (and therefore by movement of the sensor components mounted thereto). When a bump is detected, the controller can operate the drive wheels to change a direction of travel to avoid the object causing the bump. Once the bumper 104 is released, connecting features can cause the bumper 104 to return to a neutral position where the bumper 104 is positioned to sense a bump caused by the next object the bumper 104 encounters. Such a process can be repeated for each object bump on the bumper 104.

When the bumper 104 is a floating bumper full-perimeter bumper, that is, the bumper 104 is secured to the outer shell 102 such that the bumper 104 completely surrounds (or substantially surrounds) a periphery of the outer shell 102 (and the body 116) and the bumper 104 can be movable independent of, and with respect to, the body 116 and the outer shell 102 in all 3 axes, it may be desired to detect bumps using a sensor that can detect movement of the bumper 104 in all three axes and with six degrees of total freedom (movement along x, y, and z axes, and pitch, yaw, and roll). A sensor, such as a Hall Effect sensor, can be used detect movement of the bumper in three axes. However, when a floating bumper is used, the bumper 104 can move with respect to the outer shell 102 and the body 116 during normal cleaning operations due to, for example, acceleration of the robot 100 within the environment. Because Hall Effect sensors can be relatively sensitive, such movements of the bumper 104 can be incorrectly interpreted as a bump by the controller.

This robot 100 can help address this issue by providing features that secure the bumper 104 to the outer shell 102 (such as a spring module) to limit movement of the bumper 104 due to inertial forces. The spring module can act as a breakaway device configured to resist relative movement of the bumper 104 with respect to the outer shell 102 by including one feature configured to break away from another feature when a horizontal force applied to the bumper 104 is greater than a threshold horizontal force. The threshold horizontal force can be equal to or greater than a maximum expected inertial force (caused by acceleration) allowing for only horizontal bumps to be detected that are larger than a force applied to the bumper due to acceleration of the robot. These features are discussed in further detail below.

Figure 2A:
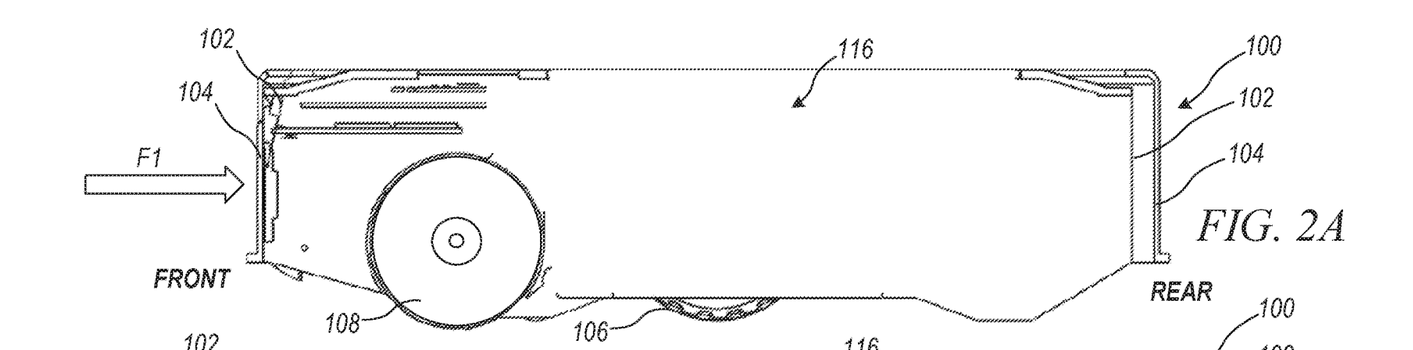
FIG. 2A illustrates a side cross-sectional view of an autonomous cleaning robot across indicators 16-16 of FIG. 15 in a first condition, in accordance with at least one example of this disclosure.
Figures 2B, 2C:
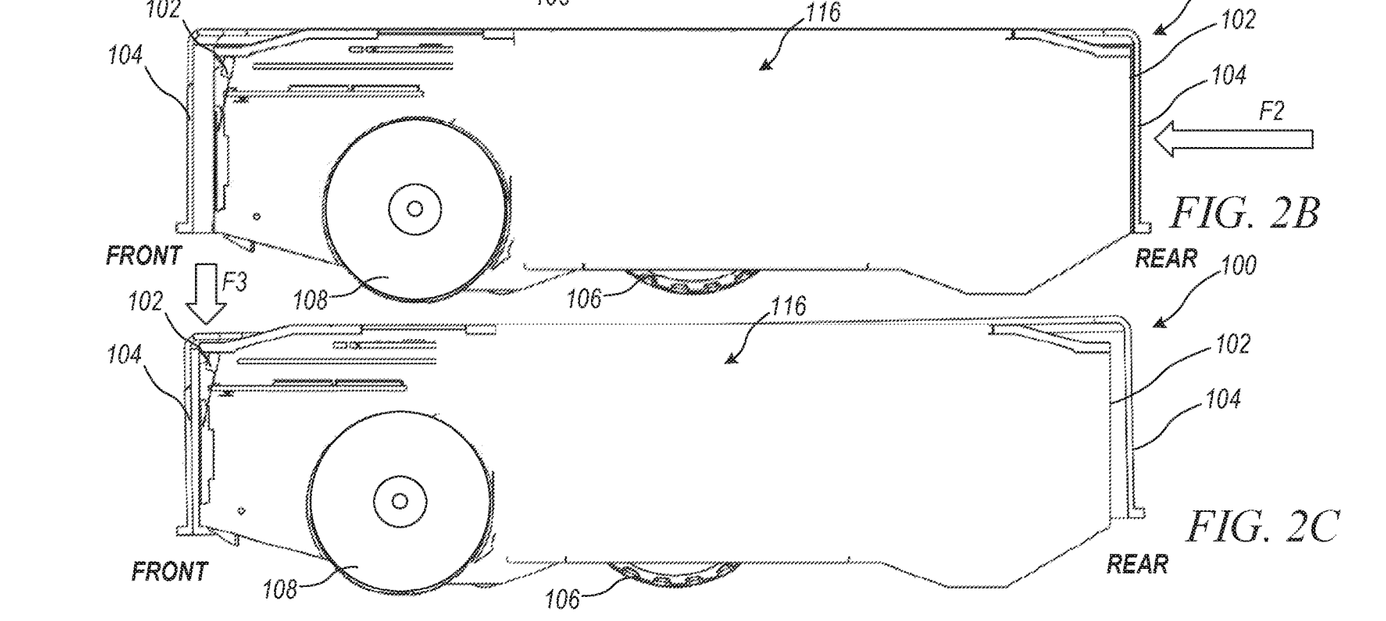
FIG. 2B illustrates a side cross-sectional view of an autonomous cleaning robot across indicators 16-16 of FIG. 15 in a second condition, in accordance with at least one example of this disclosure.
FIG. 2C illustrates a side cross-sectional view of an autonomous cleaning robot across indicators 16-16 of FIG. 15 in a third condition, in accordance with at least one example of this disclosure.

FIG. 2A illustrates a side cross-sectional view of the autonomous mobile cleaning robot 100 across indicators 2-2 of FIG. 1 in a first condition, in accordance with at least one example of this disclosure. FIG. 2B illustrates a side cross-sectional view of the autonomous mobile cleaning robot 100 across indicators 2-2 of FIG. 1 in a second condition, in accordance with at least one example of this disclosure. FIG. 2C illustrates a side cross-sectional view of the autonomous mobile cleaning robot 100 across indicators 2-2 of FIG. 1 in a third condition, in accordance with at least one example of this disclosure. Orientation indicators Rear and Front are shown in FIGS. 2A-2C. FIG. 2A shows force F1, FIG. 2B shows force F2, and FIG. 2C shows force F3. FIGS. 2A-2C are discussed below concurrently.

More specifically, FIG. 2A shows the force F1 applied to a front portion of the bumper 104, which can cause the bumper 104 to translate to the rear with respect to the body 116 and the outer shell 102. Also, FIG. 2B shows the force F2 applied to a rear portion of the bumper 104, which can cause the bumper 104 to translate to the front with respect to the body 116 and the outer shell 102. FIG. 2C shows the force F3 applied to a top portion of the bumper 104, which can cause the bumper 104 to translate downward with respect to the body 116 and the outer shell 102. In some example, the force F3 can cause the bumper 104 to move downward only near the force. For example, the force F3 can cause only a front portion of the bumper 104 to move downward. Such movements can be detected by bumper sensors (discussed below), which can detect movement of the bumper 104 relative to the body 116 and the outer shell 102.

FIGS. 2A-2C show additional details of the robot 100, such as drive wheels 106 and an extractor assembly 108. The drive wheels 106 can be supported by the body 116 of the robot 102. The wheels 106 can be connected to and rotatable with a shaft; the wheels 106 can be configured to be driven by a motor to propel the robot 100 along a surface of an environment, where the motor is in communication with the controller 112 to control such movement of the robot 100 in the environment.

The extractor assembly 108 can include one or more rollers or brushes rotatable with respect to the body 116 to collect dirt and debris from the environment. The rollers can be powered by one or more motors in communication with the controller 112.

Figure 3A:
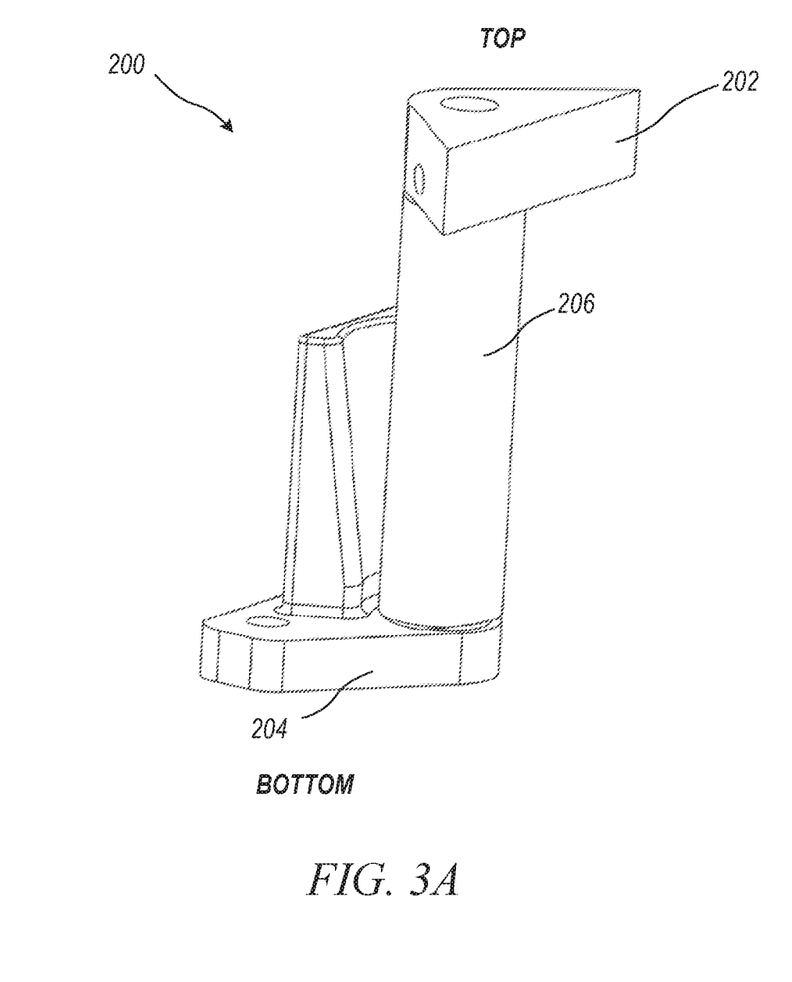
FIG. 3A illustrates a side isometric view of a portion an autonomous cleaning robot, in accordance with at least one example of this disclosure.
Figure 3B:
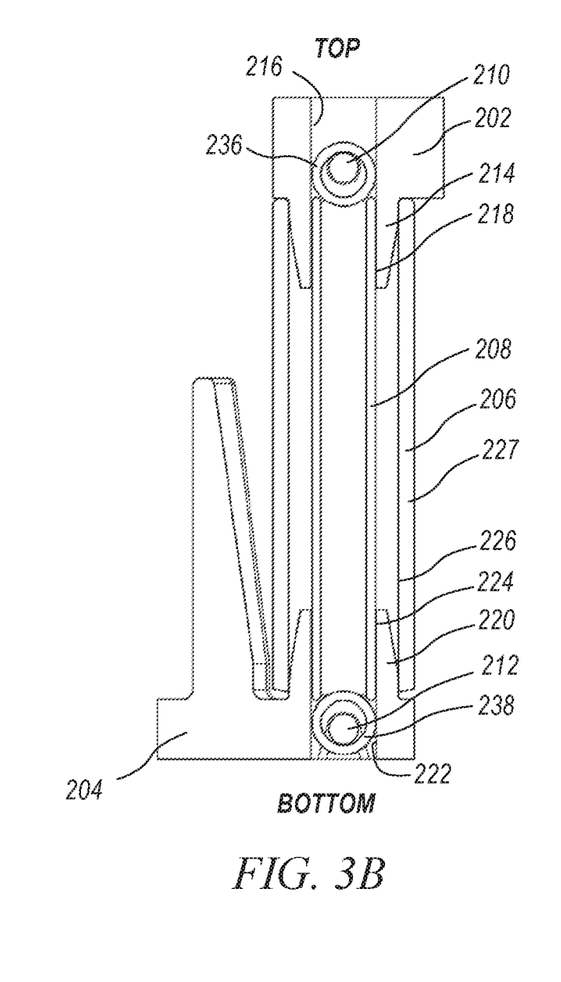
FIG. 3B illustrates a cross-sectional view of a portion of an autonomous cleaning robot, in accordance with at least one example of this disclosure.
Figure 3C:
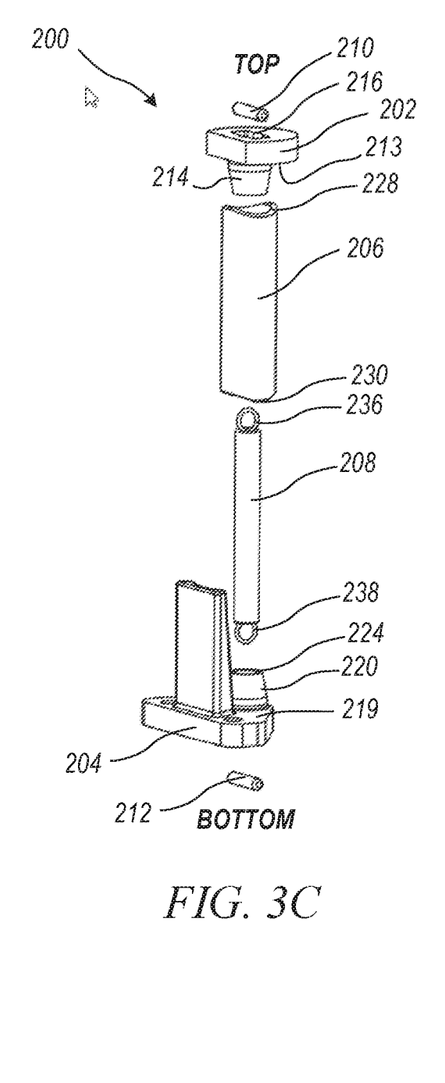
FIG. 3C illustrates an exploded isometric view of a portion of an autonomous cleaning robot, in accordance with at least one example of this disclosure.
Figure 3D:
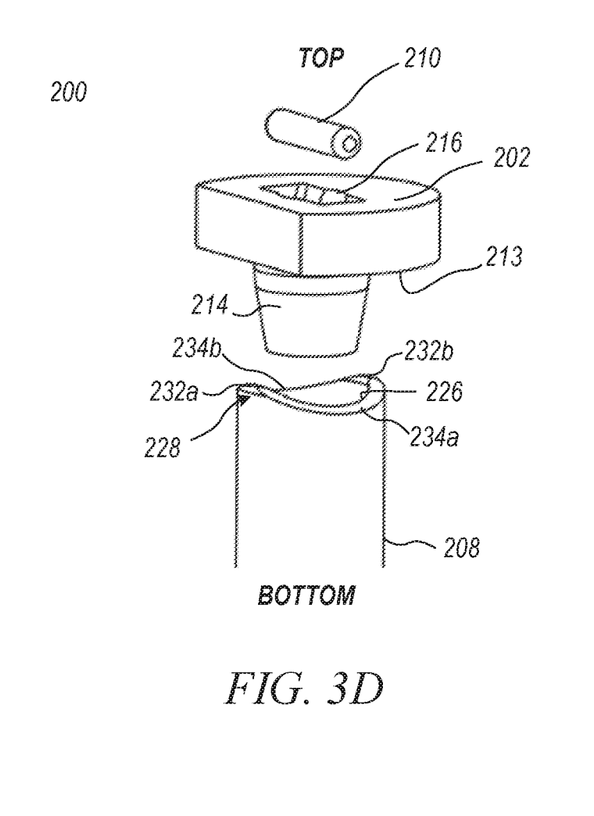
FIG. 3D illustrates a focused exploded isometric view of a portion of an autonomous cleaning robot, in accordance with at least one example of this disclosure.

FIG. 3A illustrates a side isometric view of a spring module 200 of an autonomous cleaning robot, in accordance with at least one example of this disclosure. FIG. 3B illustrates a cross-sectional view of the spring module 200 of an autonomous cleaning robot, in accordance with at least one example of this disclosure. FIG. 3C illustrates an exploded isometric view of the spring module 200 of an autonomous cleaning robot, in accordance with at least one example of this disclosure. FIG. 3D illustrates a focused exploded isometric view of the spring module 200 of an autonomous cleaning robot, in accordance with at least one example of this disclosure. FIGS. 3A-3D are discussed below concurrently.

The spring module 200 can include an upper connector 202 (or a cap or bumper mount), a lower connector 204 (or a cap or bumper mount), a tube 206, a spring 208, an upper pin 210, and a lower pin 212. The upper connector 202 can include a lower surface 213, a tube retainer 214, a pin slot 216, and a spring bore 218. The lower connector 204 can include an upper surface 219, a tube retainer 220, a pin slot 222, and a spring bore 224. The tube 206 can include a tube bore 226, an upper portion 228, and a lower portion 230. The upper portion 228 can include tips 232a and 232b and recesses 234a and 234b (though not visible, the lower portion 230 can include similar components). The spring 208 can include eyes 236 and 238.

The spring module 200 can generally be an assembly configured to connect the bumper 104 to the outer shell 102 such that the bumper 104 is floating with respect to the outer shell 102. The components of the spring module 200 can be comprised of materials such as one or more of metals, plastics, foams, elastomers, ceramics, composites, combinations thereof, or the like.

The upper connector 202 can be connected to the outer shell 102, and the bottom connector 204 can be connected to the bumper 104. In some examples, the upper connector 202 can be integrated into (formed with) the outer shell 102, and/or the bottom connector 204 can be integrated into (formed with) the bumper 104. In some examples, the bottom connector 204 can be connected to the outer shell 102 and the upper connector 202 can be connected to the bumper 104.

The lower surface 213 of the upper connector 202 can face substantially downward and the tube retainer 214 can be connected to the lower surface 213 and can extend downward therefrom. In some examples, the tube retainer 214 can include a taper. The pin slot 216 can extend upward from the tube retainer 214 and can extend into and through an upper portion of the upper connector 202. The pin slot 216 can be sized to receive the upper pin 210 therein. The pin slot 216 can be a cross-bore or cross-slot with respect to the spring bore 218. The spring bore 218 can extend through the tube retainer 214 and can be sized to receive the eye 236 of the spring 208 (and can be sized to receive at least a portion of the spring 208 therein).

The upper surface 219 of the lower connector 204 can face substantially upward. The tube retainer 220 can be connected to the upper surface 219 and can extend upward therefrom. In some examples, the tube retainer 220 can include a taper. The pin slot 222 can extend downward from the tube retainer 220 and can extend into and through a lower portion of the lower connector 204, and can be sized to receive the lower pin 212 therein. The pin slot 222 can be a cross-bore or cross-slot with respect to the spring bore 218. The spring bore 218 can extend through the tube retainer 220 and can be sized to receive the eye 238 of the spring 208 (and the spring bore 218 can be sized to receive at least a portion of the spring 208 therein).

The spring 208 can be an extension spring, such as a coiled extension spring. The spring 208 can be other types of biasing elements in other examples, and can include multiple biasing elements, The eyes 236 and 238 can be connected to the body of the spring and can be configured to receive the upper pin 210 and lower pin 212, respectively, therethrough to secure the spring 208 to the upper connector 202 and the lower connector 204, respectively. In some examples, the spring assembly 200 can be replaced with a single coiled extension spring configured to resist horizontal movement.

The upper pin 210 and the lower pin 212 can each be pins (or can be other fasteners) positionable within respective pin slots 216 and 222 of the upper connector 202 and the lower connector 202, respectively, to pass through respective eyes 236 and 238. The upper pin 210 can engage the pin bore 216 in a friction or interference fit to secure the eye 236 within the pin slot 216 of the upper connector 202. Similarly, the lower pin 212 can engage the pin slot 222 in a friction or interference fit to secure the eye 238 within the pin slot 222 of the lower connector 204.

In some examples, only one pin may be included (such as the upper pin 210). In such an example, a bottom portion of the spring 208 can include a feature (such as a T-shape portion) configured to retain the spring 208 in the pin slot of the lower connector, allowing the spring 208 to be dropped into the assembly from the bottom and then pinned to the top connector 202 using the pin 210. In other examples, the top pin 210 can be omitted and the T-shape portion of the spring 208 can be at the top of the spring 208 and the spring 208 can be pinned to the bottom connector 204.

The tube bore 226 can extend through a body 227 of the tube 206 and can be sized to receive and retain the spring 208 therein such that the spring 208 can translate within the tube bore 226. The tube bore 226 can also be sized to receive the tube retainers 214 and 220 therein. In other examples, the tube 206 can be sized to fit within the retainers 214 and 220.

The upper portion 228 can be configured to engage the lower surface 213 of the upper connector 202 and the lower portion 230 can be configured to engage the upper surface 219 of the lower connector 204. The upper portion 228 can have a non-planar shape where the tips 232a and 232b extend further upward than the recesses 234a and 234b. Because the upper portion is non-planar, the lower surface 213 is not able to engage an entirety of the surface of the upper portion 228, which can affect a breakaway or threshold force of the upper portion 228 from the bottom surface 213, as discussed below in further detail. The lower portion 230 can be similarly configured.

In operation of some examples, the spring assembly 200 can suspend the bumper 104 from the body 116 and the outer shell 102 of the robot 100. When the bumper 104 encounters a vertical force, such as the force F3 of FIG. 2C, the bumper 104 can transfer the vertical force to the lower connector 204, which can force the lower pin 272 downward, causing the spring 208 to stretch because the eye 236 is pinned to the top connector 202, which is secured to the outer shell 102. This can allow the bumper 104 to move vertically with respect to the outer shell 102 when the force F3 is greater than the preload spring force of the spring 208. The tube retainers 214 and 220 can be sized such that a combined length of the tube retainers 214 and 220 is longer than a maximum allowable vertical displacement of the bumper 204, which can help prevent the tube 206 from completely disengaging from the upper connector 202 and the lower connector 204.

The tube 206 becoming disengaged from the retainers 214 and 220 can be increased in likelihood due to the recesses 234a and 234b. Therefore, the recesses 234a and 234b can be as small as is necessary to allow the tube 208 to allow horizontal movement of the tube 208 with respect to the retainers 214 and 220. In some examples, the recesses 234a and 234b can be sized to allow the tube 208 to tilt by between 1 degree and 20 degrees. In some examples, the recesses 234a and 234b can be sized to allow the tube 208 to tilt by 5, 6, 7, 8, 9, 10, 11, 12, 13, 14, or 15 degrees. In some examples, the recesses 234a and 234b can be sized to allow the tube to tilt by 10 degrees.

Such vertical movement can be detected by sensors connected to the bumper 104 and the outer shell 104, as discussed below. The controller can receive a signal indicating the vertical force or bump and the controller can therefore instruct the robot 100 to move to avoid the object, which can help avoid a wedging condition. When the vertical force (such as the force F3) is removed from the bumper 104, because the spring 208 is under tension when connected to the upper pin 210 and the lower pin 212, the spring 208 can cause the lower connector 204 to return the lower connector such that the lower portion 230 of the tube 206 contacts the upper surface 219 of the lower connector and such that the upper portion 228 of the tube 206 contacts the lower surface 213 of the upper connector 202. Such a process can be repeated.

In further operation of some examples, when a horizontal force, such as the force F1 of FIG. 2A or the force F2 of FIG. 2B, is applied to the bumper, the bumper 104 can transfer the vertical force to the lower connector 204. Because the spring 208 is under tension when connected to the upper pin 210 and the lower pin 212 (in a resting or neutral position), the lower portion 230 of the tube 206 contacts the upper surface 219 of the lower connector 204 and the upper portion 228 of the tube 206 contacts the lower surface 213 of the upper connector 202 in the neutral position. Because of this contact and because the lower surface 213 and the upper surface 219 are caused to be parallel (or substantially parallel) by contact with the tube 206 and by use of multiple tube assemblies around a the robot 100, the lower connector 204 cannot move horizontally with respect to the upper connector 202 until the tube 206 breaks contact with the lower connector 204 and/or the upper connector 202. The taper of the tube retainers 214 and 220 can allow the tube 206 to tilt with respect to the tube retainers 214 and 220 when the tube 206 breaks contact with the lower connector 204 and/or the upper connector 202.

Such movement of the lower connector 204 with respect to the upper connector 202 can occur when the horizontal force is greater than a breakaway force dictated by a spring force Fs of the spring 208 and dimensions of the tube 206, as discussed in further detail below in FIGS. 5A and 5B. In some examples, the geometry of the tube 206 and the spring force Fs of the spring 208 can be selected such that the threshold force required to cause movement of the lower connector 204 with respect to the upper connector 202 is greater than a force caused by inertial forces applied to the bumper 104 caused by acceleration of the robot 100.

This design can help reduce false positive bumps from being detected by the controller of the robot 100, which can help improve navigation of the robot 100 within an environment. This design can also help reduce hysteresis as the mechanical interaction between the tube 206, the upper connector 202, and the lower connector 204 can reduce movement of the spring assembly 200 following release of the horizontal force from the bumper 104. Further, hysteresis can be minimized by reducing friction between contacting parts (such as the tube 206, the upper connector 202 and the lower connector 204), which can allow for a faster return to a neutral position. Also, the contact interfaces between the tube 206, upper connector 202 and the lower connector 204 can be rolling contacts as opposed to sliding contacts, which can further help to reduce hysteresis.

Figure 4A:
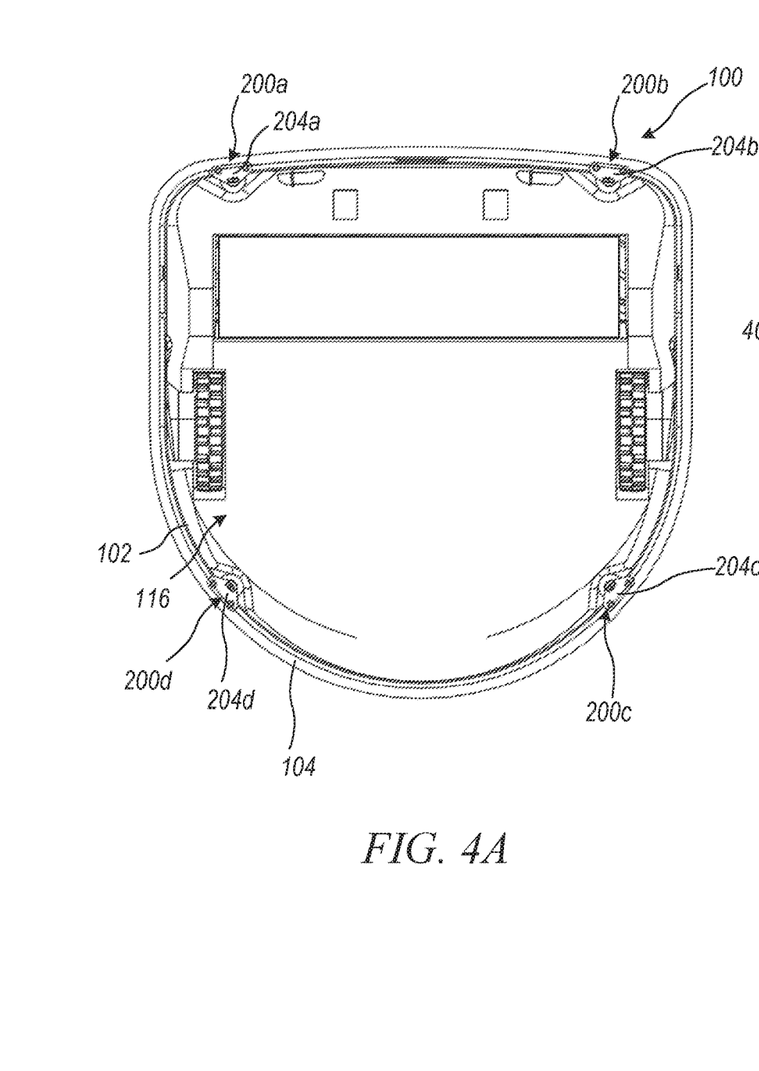
FIG. 4A illustrates a bottom view of an autonomous cleaning robot, in accordance with at least one example of this disclosure.
Figure 4B:
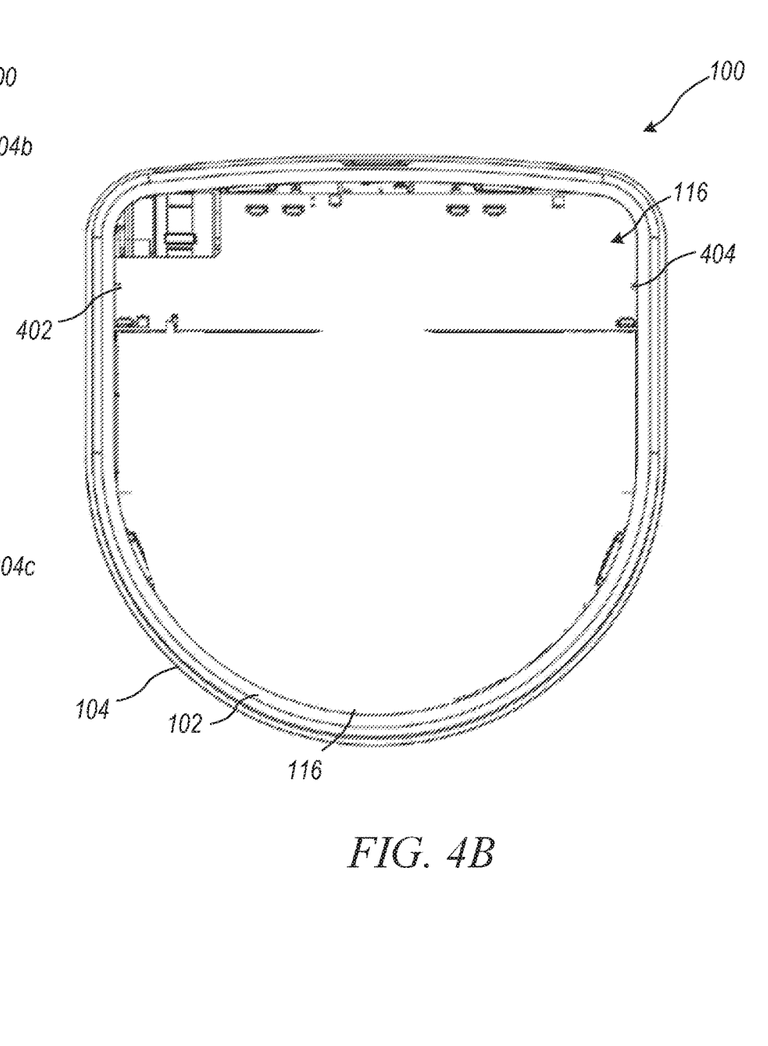
FIG. 4B illustrates a top view of an autonomous cleaning robot, in accordance with at least one example of this disclosure.

FIG. 4A illustrates a bottom view of the autonomous cleaning robot 100, in accordance with at least one example of this disclosure. FIG. 4B illustrates a top view of the autonomous cleaning robot 100, in accordance with at least one example of this disclosure. FIGS. 4A and 4B show, respectively, positioning of the spring modules 200 and positioning of sensors 402 and 404.

As shown in FIG. 4A, the bottom connectors 204a-204d of respective spring modules 200a-200d can be connected to a bottom portion of the bumper 104. FIG. 4A also shows that the spring modules 200a-200d can be spaced around a perimeter of the robot 100 to suspend the bumper 104 and to distribute support of the bumper 104. Though FIG. 4A shows four spring modules 200a-200d, fewer or more spring modules 200 can be used, such as 2, 3, 5, 6, 9, 10, or the like.

As shown in FIG. 4B, sensors 402 and 404 can be connected to the body 116 of the robot 100. The sensors can be Hall Effect sensors in some examples, including a passive component (such as a magnet) and an active sensor. The active sensor can be connected to the body 116 and the passive component can be connected to the bumper 104, which can simplify power supply and communication to the active portion of the sensors 402 and 404. Each of the sensors 402 and 404 can be configured to measure displacement (or movement) of the bumper 104 with respect to the body 116 and can be connected to the controller 112 (shown in FIG. 1) such that when movement or displacement of the bumper 104 is detected, the sensors 402 and 404 can produce a detection signal that is transmitted to the controller 112 to control operation of the robot (such as the drive wheels 106, the extractor assembly 108, etc.).

Because the passive component is connected to the bumper 104, movement of the bumper 104 with respect to the body 116, and therefore the active component, can be cause the sensors 402 and 404 to produce a sensor signal indicating direction and distance of the relative bumper 104 movement. In some examples, a 3-axis Hall effect sensor can be used to detect movement of the bumper 104 in any direction with respect to the body 116 and the outer shell 102. Though two sensors 402 and 404 are shown, fewer or more sensors can be used, such as 1, 3, 4, 5, 6, 7, 8, 9, 10, or the like.

In some examples, where two of sensors 402 and 404 are used, it may be desirable to transfer motion of the bumper 104 from one point (for example a rear portion of the bumper 104) to another point of the bumper 104 (for example the front) to help ensure that one of the sensors 402 and/or 404 detects movement of the bumper 104. In some examples, the bumper 104 can have a higher friction outer surface to help ensure that vertical forces are transformed into horizontal movement of the bumper 104 which can then be transferred around the bumper 104 and detected by horizontal detection sensors. The increased friction can be by using a roughened outer surface, by applying a coating on the outer surface, or the like.

Figure 5A:
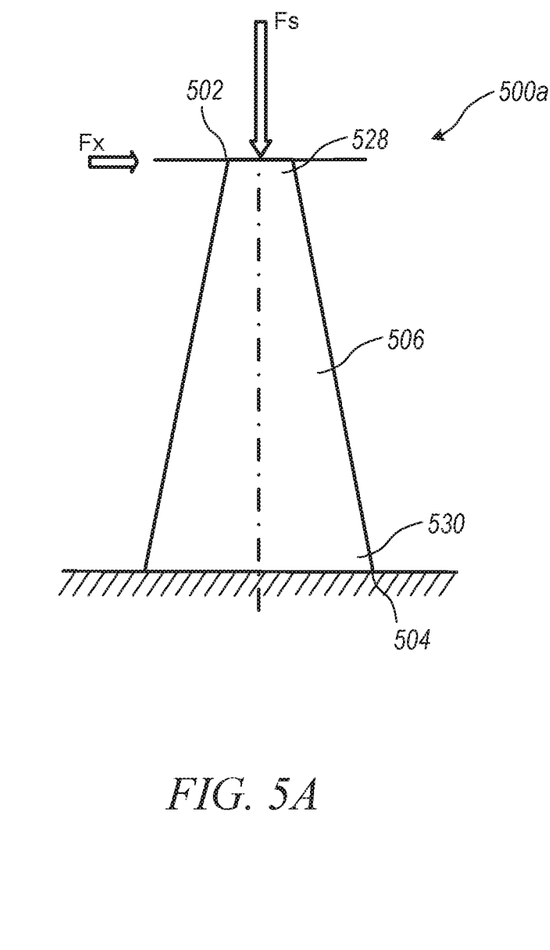
FIG. 5A illustrates a side schematic view of a portion of an autonomous cleaning robot in a first condition, in accordance with at least one example of this disclosure.

FIG. 5A illustrates a side schematic view of a spring module 500 of an autonomous cleaning robot in a first condition, in accordance with at least one example of this disclosure. FIG. 5B illustrates a side schematic view of the spring module 500 of the autonomous cleaning robot in a second condition, in accordance with at least one example of this disclosure.

FIG. 5A shows a spring force Fs applied to a tube 506 of the spring module 500, where the spring force Fs is applied substantially downward at a center of a tip connector 502, which can be engaging a top portion 528 of the spring module. FIG. 5A also shows a horizontal force Fx not yet applied to the spring module 500 or where the force Fx applied to the spring is not sufficient to overcome the breakaway force.

Figure 5B:
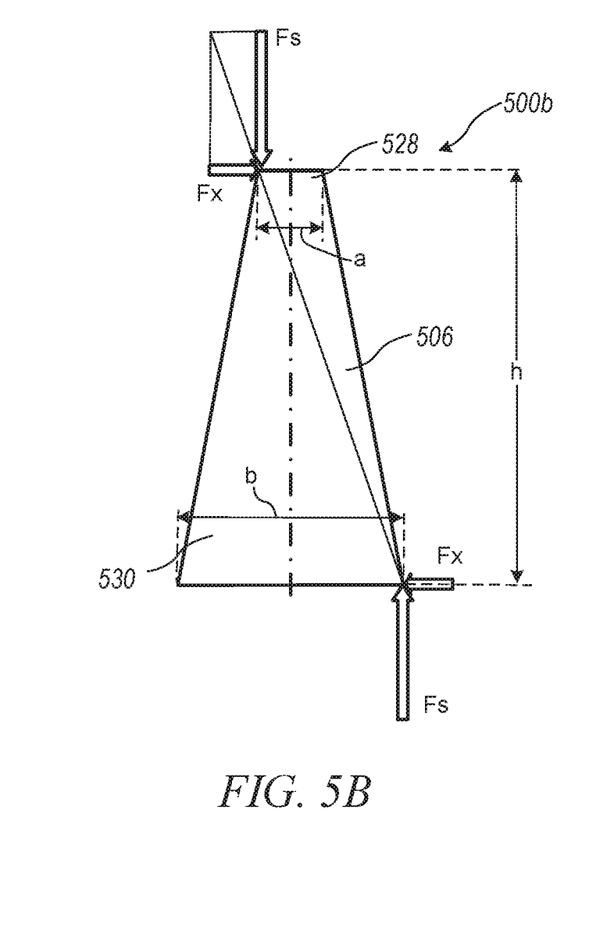
FIG. 5B illustrates a side schematic view of a portion of an autonomous cleaning robot in a second condition, in accordance with at least one example of this disclosure.

FIG. 5B shows the force Fx at a breakaway force, where Fx is applied to the lower portion 530 of the tube 506 (such as by the lower connector 504) where the spring force Fs is translated to the same location where the connected bumper and chassis surfaces can be constrained to be roughly parallel due to use of multiple spring modules connected to the bumper and the chassis. Because the tube 506 can be simply supported by the upper connector 502 and the lower connector 504, the tube 506 can tip or tilt with respect to the upper connector 502 and the lower connector 504 when the force Fx is sufficient to overcome the spring force Fs. The interaction can be described through equation 1 shown below.

$$Fx/Fs = (a+b)/2h \qquad \text{Equation 1}$$

The letter a can represent a width of the upper portion 528 of the tube 506, the letter b can represent a width of the lower portion 530 of the tube 506, and the letter h can represent a height of the tube 506. Each of a, b, h, and Fs can be selected such that the Fx required for the tube 506 to tilt or tip (break away) with respect to the upper connector 502 and the lower connector 504 is larger than a threshold force. The threshold force can be, for example, a force applied to the bumper 104 due to inertial forces caused by acceleration of the robot, because the bumper is suspended from a body of the robot.

The dimensions a and b can vary depending on what direction the tube 506 is viewed radially. In one example, the dimension a can be the same as the dimension b which can both be equal to a diameter of the tube 506. In another example, the dimension a can be very small (for example 1 millimeter) and the dimension b can be an outside diameter of the tube 506 (for example 7 millimeters), where, due to the geometry of the ends of the tube (as discussed in FIGS. 3A-3D), the dimensions of a and b are reversed from an orthogonal direction (i.e., the dimension a is the tube diameter and the dimension b is small, such as 1 millimeter). Such a geometry can help to achieve desired breakaway forces Fx and Fz (in horizontal and vertical directions) using a relatively small overall package.

The spring force Fs also represents the required breakaway force in the Z or vertical direction. The spring force Fs can be selected to allow bumper movement for detection of vertical bumps to help prevent wedging of the robot.

NOTES AND EXAMPLES

The following, non-limiting examples, detail certain aspects of the present subject matter to solve the challenges and provide the benefits discussed herein, among others.

Example 1 is an autonomous mobile cleaning robot comprising: an outer shell comprising a first feature extending outward from the outer surface; and a bumper supported by the outer shell and including an inner surface, the bumper movable with respect to the outer shell, the bumper comprising: a second feature extending from to the inner surface, the second feature engageable with the first feature to cause the bumper to move horizontally with respect to the outer shell when a vertical force is applied to the bumper.

In Example 2, the subject matter of Example 1 optionally includes a spring connected to the bumper and engaged with the bumper to bias the bumper away from the outer shell.

In Example 3, the subject matter of Example 2 optionally includes a bumper switch activatable by the bumper, the first feature and the second feature configured to cause the bumper to move to activate the bumper switch when the vertical force applied to the bumper is greater than a spring force applied to the bumper by the spring.

In Example 4, the subject matter of any one or more of Examples 1-3 optionally include wherein the first feature is monolithically formed with the outer shell.

In Example 5, the subject matter of any one or more of Examples 1-4 optionally include wherein the second feature is monolithically formed with the bumper.

Example 6 is an autonomous mobile cleaning robot comprising: a robot body including a force sensor; a bumper moveably coupled to the body; a coupling including a force limiter associated with the force sensor, the force limiter to inhibit or limit sensing by the force sensor of forces below a threshold horizontal force value.

In Example 7, the subject matter of Example 6 optionally includes wherein the coupling is connected to the robot body and to the bumper.

In Example 8, the subject matter of any one or more of Examples 6-7 optionally include wherein the coupling includes a bumper mount connected to the bumper and a cap connected to the outer shell.

In Example 9, the subject matter of Example 8 optionally includes wherein the coupling includes a spring connected to the cap and the bumper mount and a rod located between the bumper mount and the cap, the spring biasing the rod to contact the cap and the bumper such that the rod is configured to break away from the cap when a horizontal force applied to the bumper is greater than the threshold horizontal force.

In Example 10, the subject matter of Example 9 optionally includes wherein the horizontal force applied to the bumper is transferred to the rod via the bumper mount.

In Example 11, the subject matter of Example 10 optionally includes wherein a first portion of the rod has a first width that is smaller than a second width of a second portion of the rod.

In Example 12, the subject matter of Example 11 optionally includes wherein the first width, the second width, and a spring force of the spring are configured to achieve the threshold horizontal force that is greater than an inertia force applied to the bumper mount by the bumper during horizontal movement of the autonomous mobile cleaning robot.

Example 13 is an autonomous mobile cleaning robot comprising: an outer shell extending around at least a portion of a periphery of the mobile cleaning robot; a bumper connected to the outer shell and movable with respect to the outer shell when the bumper is connected to the outer shell, the bumper including an inner surface; a spring module connected to the outer shell and to the bumper, the spring module comprising: a bumper mount connected to the bumper; a cap connected to the outer shell; a spring connected to the cap and the bumper mount; and a rod located between the bumper mount and the cap, the spring biasing the rod to contact the cap and the bumper such that the rod is configured to break away from the cap when a horizontal force applied to the bumper is greater than a threshold horizontal force.

In Example 14, the subject matter of Example 13 optionally includes wherein the horizontal force applied to the bumper is transferred to the rod via the bumper mount.

In Example 15, the subject matter of any one or more of Examples 13-14 optionally include a position sensor connected to the outer shell and configured to produce a position location based on a position of the rod with respect to the cap.

In Example 16, the subject matter of Example 15 optionally includes wherein the position sensor is a Hall effect sensor.

In Example 17, the subject matter of any one or more of Examples 15-16 optionally include wherein the position sensor is a three-dimension Hall effect sensor.

In Example 18, the subject matter of any one or more of Examples 14-17 optionally include wherein a first portion of the rod has a first width that is smaller than a second width of a second portion of the rod.

In Example 19, the subject matter of Example 18 optionally includes wherein the first width, the second width, and a spring force of the spring are configured to achieve a threshold horizontal force greater than an inertia force applied to the bumper mount by the bumper during horizontal movement of the autonomous mobile cleaning robot.

In Example 20, the apparatuses or method of any one or any combination of Examples 1-19 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. An autonomous mobile cleaning robot comprising:
   a robot body including a displacement sensor;
   a bumper moveably coupled to the body;
   a coupling including a displacement limiter including a tube, the displacement limiter associated with the displacement sensor, the tube of the displacement limiter to inhibit or limit sensing by the displacement sensor of displacement of the bumper from the robot body caused by forces below a threshold horizontal force value.

2. The robot of claim 1, wherein the coupling is connected to the robot body and to the bumper.

3. The robot of claim 1, wherein the coupling includes a bumper mount connected to the bumper and a cap connected to an outer shell of the robot body.

4. The robot of claim 3, wherein the coupling includes a spring connected to the cap and the bumper mount and a tube located between the bumper mount and the cap, the spring biasing the tube to contact the cap and the bumper such that the tube is configured to break away from the cap when a horizontal force applied to the bumper is greater than the threshold horizontal force.

5. The autonomous mobile cleaning robot of claim 4, wherein the horizontal force applied to the bumper is transferred to the tube via the bumper mount.

6. The autonomous mobile cleaning robot of claim 5, wherein the horizontal force applied to the bumper is transferred to the robot body when the horizontal force is greater than the threshold horizontal force.

7. The autonomous mobile cleaning robot of claim 5, wherein a first portion of the tube has a first width that is smaller than a second width of a second portion of the tube.

8. The autonomous mobile cleaning robot of claim 7, wherein the first width, the second width, and a spring force of the spring are configured to achieve the threshold horizontal force that is greater than an inertia force applied to the bumper mount by the bumper during horizontal movement of the autonomous mobile cleaning robot.

9. The autonomous mobile cleaning robot of claim 4, wherein the spring is configured to allow the tube to separate from one or more of the cap and the bumper mount when a vertical force applied to the bumper is greater than a threshold vertical force value.

10. The autonomous mobile cleaning robot of claim 9, wherein the displacement sensor is configured to detect movement of the bumper when the tube separates from one or more of the cap and the bumper mount.

11. An autonomous mobile cleaning robot comprising:
an outer shell extending around at least a portion of a periphery of the mobile cleaning robot;
a bumper connected to the outer shell and movable with respect to the outer shell when the bumper is connected to the outer shell;
a spring module connected to the outer shell and to the bumper, the spring module comprising:
a bumper mount connected to the bumper;
a cap connected to the outer shell;
a spring connected to the cap and the bumper mount; and
a tube located between the bumper mount and the cap; the spring biasing the tube to contact the cap and the bumper such that the tube is configured to break away from the cap when a horizontal force applied to the bumper is greater than a threshold horizontal force.

12. The autonomous mobile cleaning robot of claim 11, wherein the horizontal force applied to the bumper is transferred to the tube via the bumper mount.

13. The autonomous mobile cleaning robot of claim 12, wherein the spring is configured to allow the tube to separate from one or more of the cap and the bumper mount when a vertical force applied to the bumper is greater than a threshold vertical force value.

14. The autonomous mobile cleaning robot of claim 13, further comprising:
a position sensor connected to the outer shell and configured to produce a position location based on a position of the tube with respect to the cap.

15. The autonomous mobile cleaning robot of claim 14, wherein the position sensor is configured to detect movement of the bumper when the tube separates from one or more of the cap and the bumper mount.

16. The autonomous mobile cleaning robot of claim 11, wherein a first portion of the tube has a first width that is smaller than a second width of a second portion of the tube.

17. The autonomous mobile cleaning robot of claim 16, wherein the first width, the second width, and a spring force of the spring are configured to achieve a threshold horizontal force greater than an inertia force applied to the bumper mount by the bumper during horizontal movement of the autonomous mobile cleaning robot.

18. An autonomous mobile cleaning robot comprising:
an outer shell extending around at least a portion of a periphery of the mobile cleaning robot;
a bumper connected to the outer shell and movable with respect to the outer shell when the bumper is connected to the outer shell;
a spring module connected to the outer shell and to the bumper, the spring module comprising:
a bumper mount connected to the bumper;
a cap connected to the outer shell;
a spring connected to the cap and the bumper mount; and
a tube located between the bumper mount and the cap, the spring biasing the tube to contact the cap and the bumper such that the tube is configured to break away from the cap when a horizontal force applied to the bumper is greater than a threshold horizontal force, and the spring configured to allow the tube to separate from one or more of the cap and the bumper mount when a vertical force applied to the bumper is greater than a threshold vertical force value.

19. The autonomous mobile cleaning robot of claim 18, further comprising:
a position sensor connected to the outer shell and configured to produce a position location based on a position of the tube with respect to the cap.

20. The autonomous mobile cleaning robot of claim 18, wherein the position sensor is a three-dimension Hall effect sensor.

* * * * *